(12) United States Patent
Gupta et al.

(10) Patent No.: US 8,874,600 B2
(45) Date of Patent: Oct. 28, 2014

(54) SYSTEM AND METHOD FOR BUILDING A CLOUD AWARE MASSIVE DATA ANALYTICS SOLUTION BACKGROUND

(75) Inventors: Himanshu Gupta, New Delhi (IN);
Rajeev Gupta, Noida (IN); Laurent S. Mignet, New Delhi (IN); Mukesh K. Mohania, Agra (IN); Ullas B. Nambiar, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/697,236

(22) Filed: Jan. 30, 2010

(65) Prior Publication Data

US 2011/0191361 A1 Aug. 4, 2011

(51) Int. Cl.
*G06F 17/30* (2006.01)

(52) U.S. Cl.
CPC ............... *G06F 17/30424* (2013.01)
USPC ........................ 707/763; 707/764

(58) Field of Classification Search
CPC ............ G06F 17/30595; G06F 17/30598; G06F 17/30601
USPC ............ 707/770, 706, 769, 763, 764
See application file for complete search history.

(56) References Cited

U.S. PATENT DOCUMENTS

| | | | | |
|---|---|---|---|---|
| 5,819,273 A * | 10/1998 | Vora et al. | ............................. | 1/1 |
| 6,282,537 B1 * | 8/2001 | Madnick et al. | ............. | 707/716 |
| 6,760,719 B1 * | 7/2004 | Hanson et al. | ........................ | 1/1 |
| 7,523,123 B2 | 4/2009 | Yang et al. | | |
| 7,590,620 B1 | 9/2009 | Pike et al. | | |
| 7,912,854 B2 * | 3/2011 | Owens et al. | ................. | 707/776 |
| 8,005,870 B1 * | 8/2011 | Bedell et al. | .................. | 707/802 |
| 2003/0177111 A1 * | 9/2003 | Egendorf et al. | ................. | 707/3 |
| 2005/0251540 A1 | 11/2005 | Sim-Tang | | |
| 2006/0041840 A1 * | 2/2006 | Blair et al. | .................... | 715/513 |
| 2007/0038659 A1 | 2/2007 | Datar et al. | | |
| 2008/0098370 A1 | 4/2008 | Fontoura et al. | | |
| 2008/0127146 A1 | 5/2008 | Liao et al. | | |
| 2008/0133474 A1 | 6/2008 | Hsiao et al. | | |
| 2008/0162209 A1 * | 7/2008 | Gu et al. | ........................... | 705/7 |
| 2009/0018996 A1 * | 1/2009 | Hunt et al. | ........................ | 707/2 |
| 2009/0055361 A1 * | 2/2009 | Birdwell et al. | .................. | 707/3 |
| 2009/0055370 A1 * | 2/2009 | Dagum et al. | .................... | 707/4 |

OTHER PUBLICATIONS

Yang, Hung-Chin, et al, "Map-reduce-merge: simplified relational data processing on large clusters", International Conference on Management of Data, Proceedings of the 2007 ACM SIGMOD International Conference on Management of Data.

Papadimitriou, Spiros, et al, "DisCo: Distributed Co-clustering with Map-Reduce, A Case Study Towards Petabyte-Scale End-to-End Mining", IBM T.J. Watson Research Center, Hawthorne, NY.

Abouzeid, Azza, et al, "HadoopDB: An Architectural Hybrid of MapReduce and DBMS Technologies for Analytical Workloads", VLDB '09, Aug. 24-28, 2009, Lyon, France.

(Continued)

*Primary Examiner* — Cam-Y Truong
(74) *Attorney, Agent, or Firm* — Ference & Associates LLC

(57) ABSTRACT

Embodiments of the invention provide data management solutions that go beyond the traditional warehousing system to support advanced analytics. Furthermore, embodiments of the invention relate to systems and methods for extracting data from an existing data warehouse, storing the extracted data in a reusable (intermediate) form using data parallel and compute parallel techniques over cloud, query processing over the data with/without compute parallel techniques, and providing querying using high level querying languages.

14 Claims, 12 Drawing Sheets

(56) References Cited

OTHER PUBLICATIONS

"Lecture Notes in Business Information Processing", Business Intelligence for the Real-Time Enterprise, published by Springer Berlin Heidelberg, 2009, pp. 1-11.

Atkinson, Malcolm P., et al, "A Distributed Architecture for Data Mining and Integration", DADC '09, Jun. 9-10, Munich, Germany.

Boulon, Jerome, et al, "Chukwa: A large-scale monitoring system", University of California at Berkeley, Berkeley, California.

Chaiken, Ronnie, et al, "SCOPE: easy and efficient parallel processing of massive data sets", Proceedings of the VLDB Endowment, vol. 1, Issue 2 (Aug. 2008), pp. 1265-1276.

www.apache.org,\Lucene\Apache Lacene—Overview, Last Published Dec. 6, 2009, Copyright 2006 The Apache Software Foundation.

www.apache.org,\hadoop\Welcome to Apache Hadoop, Last Published Jul. 16, 2009, Copyright 2007 The Apache Software Foundation.

International Searching Authority, International Search Report for International Application PCT/EP2011/051066, Apr. 8, 2011, 2 pages (EP).

MapReduce: Simplified Data Processing on Large Clusters, Jeffrey Dean and Sanjay Ghemawat, Communications of the ACM—50th Anniversary Issue: 1958-2008, vol. 51, No. 1, Jan. 2008, pp. 107-113.

The Architecture Journal, Darryl Chantry et al. Apr. 9, 2009, pp. 1-41.

* cited by examiner

| Scenario / Use Case | Data Required | Business Insight | ROI |
|---|---|---|---|
| Customer churn analysis | 1. Customer profile<br>2. Plan<br>3. Usage (minutes and frequency)<br>4. Sphere of influence<br>5. Customer logs | 1. Which customer is likely to churn<br>2. What promotion can be offered to avoid that<br>3. How much time do you have to avoid churning. | 27% of subscribers are lost every year. Cost of gaining a new subscriber is between $300-600 whereas cost of retaining is much less. |
| Fraud detection | Caller number, call duration, geographic origin, destination, long distance carrier.<br>1. Analyze CDRs for velocity trap<br>2. Look for significant deviation from normal patterns | Rules identifying fraud, e.g., (TIME-OF-DAY = NIGHT) AND (LOCATION = CITY A) → FRAUD (confi.= 0.89 ) | Revenue assurance |
| Financial product/ service Innovation | 1. Product usage/transaction data<br>2. Customer data<br>3. Product data | 1. Identify changes in behavior and interest<br>2. Future demand for product<br>3. Saturation of old offerings<br>4. Forecasting and budgeting marketing expenditure across products/services<br>5. New offerings/market<br>6. Reinventing offering w.r.t customer segment/geography | Aids in decision to continue or change/build products and thereby retain/attract customers |

FIG. 5

| Lifecycle Management Scenarios |
|---|
| 1. Take median of outstanding balances of all prepaid customers. Take median of the 2 halves also, such that there are 4 sets of customers. Exclude the ones with median values. |
| 2. Take the Average decrement value of all Prepaid customers of last month. Get only those customers that have the Quartile values. Also get those customers that fall between the inter-quartile range. |
| 3. Only select those customers who have recharged their prepaid card, on Even dates. |
| 4. Select only those customers, whose Absolute value of either Unbilled Amount is 100 (It could be -100 if there an advance paid in the past). |
| 5. Let x = (Avg decrement in last 3 months / MOU calls to the call center)<br>Let X1 = even x; and x2 = odd x.<br>(1) Now select all co-prime X2's (i.e., select all those customer's whose x is an odd value, and out of such customers, whose GCD (or HCF) is 1).<br>(2) Select all those X1's whose GCD (or HCF) is 10. |
| The purpose here is to select only samples from a few select group of customer's by looking at their value to the company in on particular term, such as ARPU. |

FIG. 6

- Call details
  - CALL_START_DATE
  - DISCONNECT_REASON
  - CALLING_NUM
  - CALLED_NUM
  - SUBSCRIPTION_TYPE
  - ROAMING_IND
  - EVENT_DURATION

- Billing details
  - IN_BAL_BEFORE_CALL
  - IN_BAL_AFTER_CALL
  - IN_CHRG_AMT

- Network related attributes
  - CIRCLE_ID
  - ORIGINATION_AREA_CODE
  - DESTINATION_AREA
  - OPERATOR_CODE
  - OPERATOR_TO
  - FIRST_CELLSITE
  - LAST_CELLSITE
  - ORIG_A_NUM
  - ORIG_B_NUM
  - ORIG_C_NUM

- Subscriber details
  - IMEI
  - IMSI

FIG. 7

| Sr No. | Use Case | Analytics Needed | CDR Attributes |
|---|---|---|---|
| 1 | Cell-site (Tower) Usage by hour of day | For each cell site, measure the number and duration of calls | First_Cellsite, Last_Cellsite, Call_Start_Date, Event_Duration |
| 2 | Cell-site usage by type of customer (local, non-local, transit) | Determine home cell-site (i.e., site most used for each customer). Then for each cell-site, detect whether the calls are from customers who have that site as home site. If customer is not for specific telcom, then mark as transit. | First_Cellsite, Last_Cellsite, IMSI, Call_Start_Date |
| 3 | Measure Cell-site Congestion | For each cell-site, determine the % of calls during the month/day/hr that were dropped. | First-Cellsite, Last_Cellsite, Call_Start_Date, Disconnect_Reason |
| 4 | Cell-site usage for type of service (i.e., local, long-distance). | A naïve solution is to identify two CDRs that have the same calling and called numbers and time stamp and duration; a heuristic implementation is whether both caller and callee have the same home cell-site | First_Cellsite, Last-Cellsite, IMSI, Call_Start_Date, Calling_Num, Called_Num |

FIG. 8

| Query | Description | SQL statement | Output Size (for 10M) |
|---|---|---|---|
| Q1 | Get call details of all the calls with duration less than one minute | Select * from CDR where event_duration <= 60 | 6062392 |
| Q2 | Get daily call volumes for all the customers | Select caller_number, day, sum(event, duration) from CDR group by caller_number, day | 41348 |
| Q3 | Get hourly traffic for all the cell sites | Select id, hour(usage) as usage from (select id, hour, sum(duration) as usage from (select first_cell_id as id, hour(call_start_date) as hour, event_duration as duration from CDR) as T1 group by id, hour<br>UNION ALL<br>Select id, hour, sum(duration) as usage from (select last_cell_id as id, hour(call_start_date) as hour, event_duration as duration from CDR) as T2 group by id, hour as Tab group by id, hour | 236276 |

FIG. 9

SYSTEM AND METHOD FOR BUILDING A CLOUD AWARE MASSIVE DATA ANALYTICS SOLUTION BACKGROUND

BACKGROUND

The subject matter described herein generally relates to providing advanced analytics for business intelligence applications working with massive volumes of data, such as on hundreds of terabytes to petabyte scale.

Existing data warehouses and the solutions built up around them are increasingly unable to provide reasonable response times to data management requests due to the expanding volume of data the warehouses are maintaining This is especially true in certain industries, such as telecommunications, where millions and even billions of new data records may be added each day to the data handling systems.

To improve response times, the rows of a table were partitioned across multiple machines with separate disks, enabling parallel I/O scans of big tables. Basic relational query operators like selection, join, grouping and aggregation were reinvented to run in parallel via similar partitioning schemes: the operations undertaken by each node in the cluster are the same, but the data being pumped through the fabric is automatically partitioned to allow each node to work on its piece of the operator independently. Finally, these architectures allowed multiple relational operators to operate at the same time, allowing pipeline parallelism in which an operator producing a data stream runs in parallel with the operator consuming it. However, data consumers used the existing architecture primarily for reporting and billing. The business intelligence derivation was only done by, for example, allowing analysts to fire ad hoc cubing queries for browsing along interesting dimensions. As such, advanced analytics applications were not utilizing the data warehouse even though many potential use cases for such analytics existed.

BRIEF SUMMARY

Embodiments of the invention broadly contemplate systems, methods, apparatuses and program products providing efficient and productive advanced analytics over massive structured data over a cloud configuration. Embodiments of the invention provide mapping APIs for existing business intelligence tools to access system data. Thus, embodiments of the invention enable existing business intelligence tools to efficiently and productively access massive structured data.

In summary, one aspect of the invention provides a system comprising: one or more data parallel clusters of computing devices storing data and configured to communicate with one or more data sources, the one or more data parallel clusters of computing devices storing intermediate data derived from structured data of the one or more data sources; and a query processor which processes system queries on the intermediate data and generates query results.

Another aspect of the invention provides a method comprising: configuring one or more data parallel clusters of computing devices to communicate with one or more data sources; storing intermediate data in the data parallel clusters of computing devices derived from structured data of the one or more data sources; and utilizing a query processor to process system queries on the intermediate data and generate query results.

A further aspect of the invention provides an apparatus comprising: one or more processors; and a computer readable storage medium having computer readable program code embodied therewith and executable by the one or more processors, the computer readable program code comprising: computer readable program code configured to receive a high level query; computer readable program code configured to convert the high level query into a low level query computation over data parallel and compute parallel clusters of computing devices; and computer readable program code configured to issue one or more query results.

A still further aspect of the invention provides a computer program product comprising: a computer readable storage medium having computer readable program code embodied therewith, the computer readable program code comprising: computer readable program code configured to operatively connect data parallel clusters of computing devices in communication with one or more data sources; computer readable program code configured to store intermediate data in the clusters derived from structured data of the one or more data sources; and computer readable program code configured to utilize a query processor to process system queries on the intermediate data and generate query results.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 5 illustrates in tabular form exemplary use case scenarios of exemplary embodiments.

FIG. 6 illustrates in tabular form exemplary lifecycle management scenarios according to exemplary embodiments.

FIG. 7 illustrates exemplary groups of attributes that may appear in a call detail record (CDR).

FIG. 8 illustrates in tabular format exemplary use case scenarios and likely associated CDRs according to exemplary embodiments.

FIG. 9 illustrates in tabular format exemplary queries (Q1, Q2, and Q3) used in an experimental case study of an exemplary embodiment.

DETAILED DESCRIPTION

Figure 1:
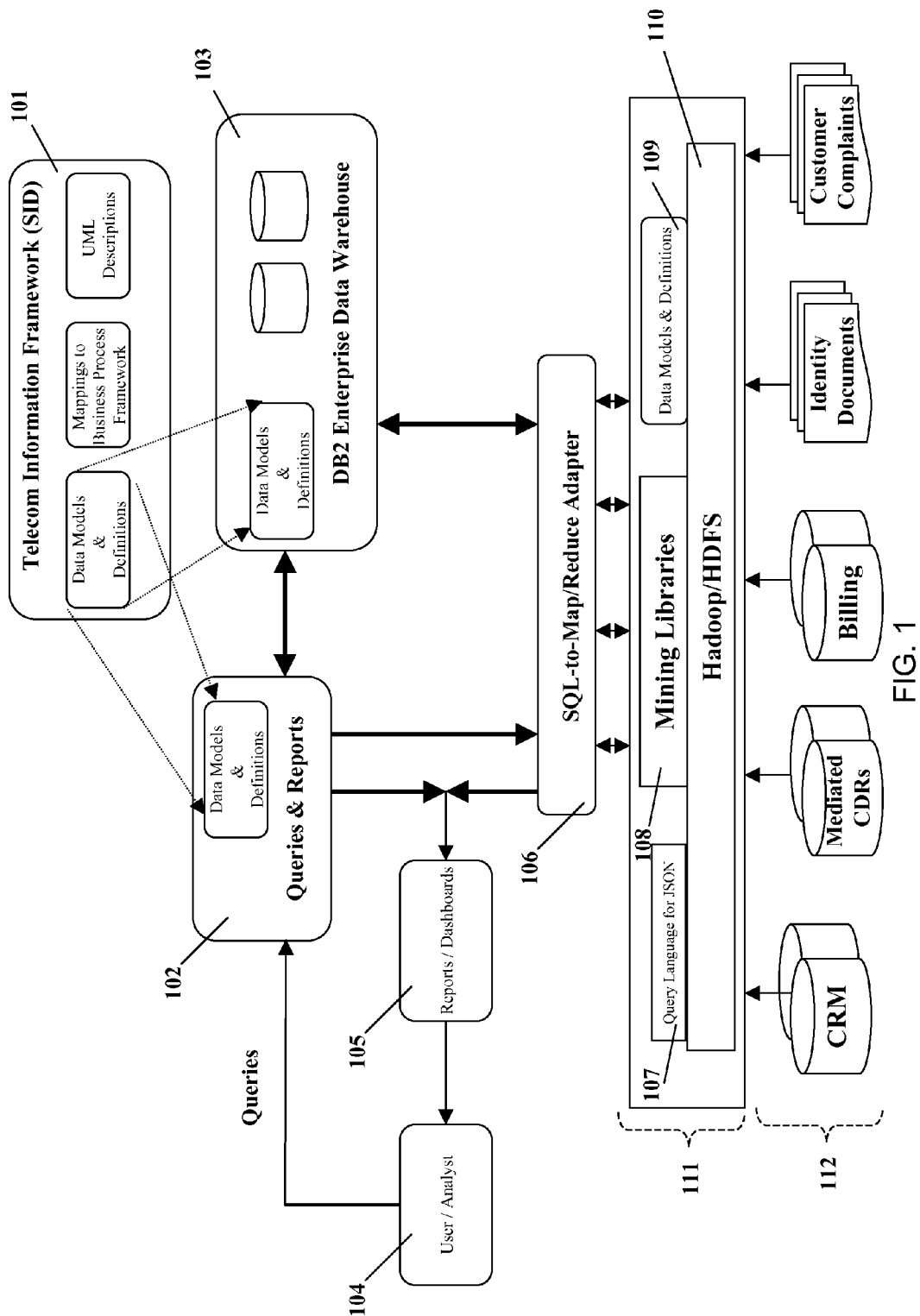
FIG. 1 illustrates an exemplary querying system according to an embodiment.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment", "an embodiment", "an aspect" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

Petabyte scale data stores will soon become a reality for many business entities, such as retailers, online merchants, credit card companies, and major telecommunication service providers. The need to analyze structured data for various business intelligence applications such as account turnover analysis and social network analysis is well known. However, the potential size to which such data will scale in the future will make solutions that revolve around data warehouses hard to scale. In addition, analytics solutions that scale to this data size are currently not readily available, data duplication methods offered by some vendors are not viable solutions, and other alternative solutions have challenges in scaling up in a cost effective manner while ensuring latency bounds are met.

A typical telecommunication company, or telco, will serve as a non-limiting case example. Telcos generate large amounts of data such as call detail records (CDRs), which describe the calls that traverse the telecommunication networks, and network data, which describe the state of the hardware and software components in the network. The subscriber base for mobile telecommunication service providers is growing at a very fast pace, including providers adding millions of new subscribers per month. Key performance indicators (KPIs) for telecommunication companies include, among other things, services utilization, call volume, and call duration. Most of this information can be derived from analysis of data in CDRs. CDR records are also useful in designing account turnover solutions. A typical CDR generated by switches on an exemplary telecommunication network may contain anywhere from 30 to 100 attributes. By way of example, FIG. 7 shows four groups of attributes appearing in an exemplary CDR that can give useful information about the subscriber, the network, billing details and call details.

Traditionally, data warehouses have been used to manage data generated at telcos. However, the warehouses and solutions built around them will be unable to provide reasonable response times in handling future expanding data volumes. The increased data is mostly brought on by the expanding customer base and proportional increase in call traffic generated over the telecommunication network. In fact, CDRs can often range between 500 million and 2 billion rows a day just for voice data resulting in nearly a terabyte of data arriving at the doorstep of data handling systems. Moreover, data retention times can range from 3-4 months to several years depending on business and/or regulatory requirements. Existing data management solutions cannot manage such volumes and hence most of the data is simply archived and stored in tapes without being used in any analysis solutions. Furthermore, with increasing subscriber base, there has been increased competition in the market leading to drop in average revenue per user (ARPU) from the voice services. Hence, telcos have been forced to provide new value added services like Short Message Service (SMS) and Multimedia Messaging Service (MMS), caller-tunes, and on-demand music to retain and attract customers. Solutions must be flexible enough to manage demands for new data sources and new application requirements.

In contrast to previous solutions, embodiments of the invention provide data management solutions that go beyond the traditional warehousing system to support advanced analytics for, among other things, generating models for churn management, better account segmentation for personalized campaign creation, fraud detection, and network usage analysis. Customer retention reduces the investment required to win new subscribers and increases network efficiency. Turnover increases exposure to fraud and bad debt and reduces investor confidence.

Embodiments of the invention relate to systems and methods for extracting data from an existing data warehouse, storing the extracted data in a reusable (intermediate) form using data parallel and compute parallel techniques over cloud, query processing over the data with/without compute parallel techniques, and providing querying using high level querying languages. Furthermore, embodiments of the invention provide an analytics platform designed to derive useful and actionable insights over the soon-to-be Petabyte scale data that will become available in industry data centers. Moreover, in order to meet the challenge of round-the-clock processing, embodiments of the invention provide high availability in the face of system and software failures and near real-time loads. Additionally, embodiments of the invention access data from one or more data warehouses, integrate the accessed data with other data sources and apply business intelligence algorithms over the integrated data.

An important requirement in most industries is to keep the costs of deployment and maintenance as low as possible. As such, embodiments of the invention provide a scalable and massive data analytics platform that can co-exist with existing data warehouse implementations. In addition, aspects of the invention are able to work on commodity hardware while being able to overcome the inevitable failures that accompany such systems. Furthermore, embodiments of the invention enable the platform to be acceptable to enterprise customers used to the querying and report generation models supported by existing database management systems, such as RDBMS.

Returning to the non-limiting telco example, a prototypical telco may add nearly 2 million accounts each month. As such, the telco is likely looking at massive amounts of data coming in the form of CDRs, transaction data arising from service requests, and huge amounts of account related data. The telco may also provide its services over a wide and diverse geographic area.

The telco may segregate its accounts from customers and their associated data into specific classes based upon certain non-personalized data. As a non-limiting example of account segregation, the telco may segregate account into two types: Prepaid and Postpaid. The Prepaid account base (and by association the data generated) may be considerably larger than the Postpaid account base. To further the illustration, the postpaid account may generate nearly a million CDRs per day while the amount for the prepaid account may be in the vicinity of a billion CDRs per day. As such, prepaid account alone may generate about a terabyte of data per day.

A typical telecommunication company may already have a data warehousing solution, such as a data warehouse powered by shared-nothing parallel IBM® DB2® implementation. In order to harness the power of a cluster, existing query processing software evolved to take advantage of multiple disks, processors, and network links operating in parallel. To achieve this, the rows of a table were partitioned across multiple machines with separate disks, enabling parallel I/O scans of big tables. Basic relational query operators like selection, join, grouping and aggregation were reinvented to run in parallel via similar partitioning schemes: the operations undertaken by each node in the cluster are the same, but the data being pumped through the fabric is automatically partitioned to allow each node to work on its piece of the operator independently. Finally, these architectures allowed multiple relational operators to operate at the same time, allowing pipeline parallelism in which an operator producing a data stream runs in parallel with the operator consuming it. However, data consumers used the existing architecture primarily for reporting and billing. In addition, business intelligence was only derived by allowing analysts to fire ad hoc cubing queries for browsing along interesting dimensions. As such, advanced analytics applications were not fully and efficiently utilizing the data warehouse even though many potential use cases for such analytics existed.

The typical telecommunication operator, for example, may likely be interested in building a dashboard that would allow the analysts and architects to understand, among other things, the voice or SMS based traffic flowing through the network along various dimensions of interest. As previously mentioned, the traffic may be captured using CDRs whose volume may be up to one terabyte per day. As a non-limiting example, one dimension of interest to a typical telecommunication may be the usage of a cell site. A cell site is a term used for denoting a site where antennas and electronic communications equipment are placed on a radio mast or tower to create a cell in a network. A cell site is composed of a tower or other elevated structure for mounting antennas, and one or more sets of transmitter/receivers transceivers, digital signal processors, control electronics, a GPS receiver for timing (e.g., for CDMA2000 or IS-95 systems), regular and backup electrical power sources, and sheltering. A synonym for "cell site" is "cell tower", although many cell site antennas are mounted on buildings rather than as towers. In GSM networks, the technically correct term is Base Transceiver Station (BTS).

A typical telecommunication may have a large number (e.g., 45,000) of cell sites of its own and may also rent sites from independent vendors. Monitoring of traffic flowing through the sites could help a telcom determine, among other things, which regions have high network congestion. In the absence of such a system, a telecommunication may have difficulty measuring the quality of signal available in various regions. Poor signal quality can lead to customer dissent and eventual churn. Furthermore, certain applicable regulatory authorities may also impose fines for service providers whose networks are highly congested. One simple solution is to add additional cell sites. However, each new site is costly to set up. In addition, determining the right spot for setting up the cell site and also measuring the potential traffic flowing through the site and thereby measuring the return on investment provide motivation for utilizing a network dashboard. Other non-limiting examples of uses for a dashboard include identifying whether users are mostly making within cell site calls, and, for cell sites in rural areas, identifying the source of traffic (e.g., the local population, connecting calls between urban centers, handing over calls for customers traveling between sites). Accessing such a data could, among other things, helps a telcom provide custom marketing solutions.

One important constraint for accessing the massive amounts of data is that typical analysts often want to run ad-hoc queries to ensure that data used for building any data reports is correct. In addition, replacing the data warehouse and instituting an entirely new solution is not advantageous because data analysts would still require use of the system over the lengthy upgrade and replacement period, analysts might lose the ability to perform ad hoc queries, and users, analysts and analytics solution designers would likely be required to train and learn a new system. As such, the embodiments of the invention leverage the existing data warehouse as much as possible and ensure the least amount of learning, while still providing support for high level query languages. Moreover, embodiments of the invention allows users working with massive volumes of data to efficiently and in near real-time analyze structured data beyond the solutions available under the traditional data warehousing system For example, some analysts use SQL queries to perform quick checks on data used for automatically generated reports. In addition, typical analysts use the same or similar approach when building new analysis reports. As such, embodiments of the invention support SQL or SQL-like high level query language.

Embodiments of the invention leverage the existing data warehouse as much as possible and ensure least amount of learning, while still providing support for high level query languages. As such, embodiments of the invention ensure ease of adaptation use of embodiment by users who were used to the tools and techniques for data access and reporting provided by existing data warehouse. Furthermore, embodiments of the invention provide a non-disruptive system that extends the capabilities of existing data warehouses by allowing data users to utilize archived data with commodity hardware. Moreover, embodiments of the invention allow data to be used for advanced analytics and building models that could be used, among other things, to analyze account segmentation for better marketing, attrition modeling for preventing churn, fraud detection, apart for the above mentioned case of network usage monitoring. Embodiments of the invention further provide flexibility for adding software or hardware resources as necessary.

The description now turns to the figures. The illustrated embodiments of the invention may be understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is depicted a block diagram of an illustrative embodiment of the advanced analytics system 111. As is apparent from the description, however, the embodiments of the invention may be implemented in any appropriately configuration, as described herein.

As shown in FIG. 1, exemplary embodiments of the invention utilize, among other things, Hadoop (developed by the Apache Software Foundation) map-reduce implementation 110 and Query Language for JavaScript® Object Notation 107 components. MapReduce is a framework developed by Google™ that has been identified as a fit platform for analyzing data in the petabyte scale. The map reduce framework provides simple model to write distributed programs to be run over a large number of cheap machines. Essentially, MapReduce is a very simple dataflow programming model that passes data items through simple user-written code fragments. MapReduce programs start with a large data file that is broken into contiguous pieces called 'splits'. Each split is converted via user-defined parsing code into (key, value) pairs that are sent to a Map module, which invokes a user supplied Map function on each pair, producing a new key and list of output values. Each (key, output list) pair is passed to a Reduce module (possibly on another machine) that gathers them together, assembles them into groups by key, and then calls a user-supplied Reduce function. The MapReduce development model was originally designed to deal with semi-structured data. However, embodiments of the invention utilize MapReduce on structured data.

Hadoop is a widely used open source implementation of the map reduce framework. In addition, the Hadoop Distributed File System (HDFS) is a massively distributed file system that is highly fault tolerant and is designed to run on cheap commodity hardware. In HDFS, each file is chopped up into a number of blocks with each block typically having a chunk of 64 MB data. Fault tolerance is achieved by replicating these data blocks over a number of nodes. HDFS has a master-slave architecture. An HDFS cluster has a single master called the 'name node.' The name node manages the file system name space, dividing the file into blocks and replicating them to suitable machines. Slaves, called 'data nodes,' manage the storage corresponding to that node. As mentioned previously, Hadoop helps in writing applications in the distributed map reduce framework where the application is divided into a large number of map and reduce jobs. Map jobs, optionally, read input from HDFS files and generate output writing them back to HDFS files, while reduce jobs take map output as input and generate its output as application output. In addition, applications can also be written as a series of map-reduce tasks.

Query Language for JavaScript® Object Notation (query language for JSON) is query language for processing structured or semistructured data based on the Java Script Object Notification (JSON) data model. In the JSON data model, data is represented as an array of objects. Objects contain a series of name:value pairs where the value can be of an atomic or a nested type. The query language for JSON is compiled to a series of map-reduce tasks which are executed over a Hadoop cloud. The query language for JSON has some of the best features of SQL and XQuery making it an easy to use yet powerful language to query JSON data. The query language for JSON provides SQL like grouping and aggregation functions frequently used for analytical queries.

Queries 102 may be run over data stored in the data warehouse 103, which may take hours or days to generate reports or dashboards 105 for use by a system analyst 104. Alternatively, relevant information 112 may be offloaded and stored in the Hadoop 110 component of the advanced analytics system 111. SQL queries can be reduced to map reduce queries through a SQL-to-Map Reduce Adapter 106 which may be run over cloud executing the queries in parallel. As such, queries 102 run through the advanced analytics system 111 embodiment of the invention depicted in FIG. 1 will complete faster and more efficiently than through a traditional data warehouse query.

In addition, as depicted in FIG. 1, queries 102 be run concurrently over the traditional data warehouse 103 and advanced analytics 111 systems. All of the data stored in the data warehouse 103 does not need to be stored in the advanced analytics system 111 because according to embodiments of the invention, both systems can be seamlessly queried together.

Figure 2:
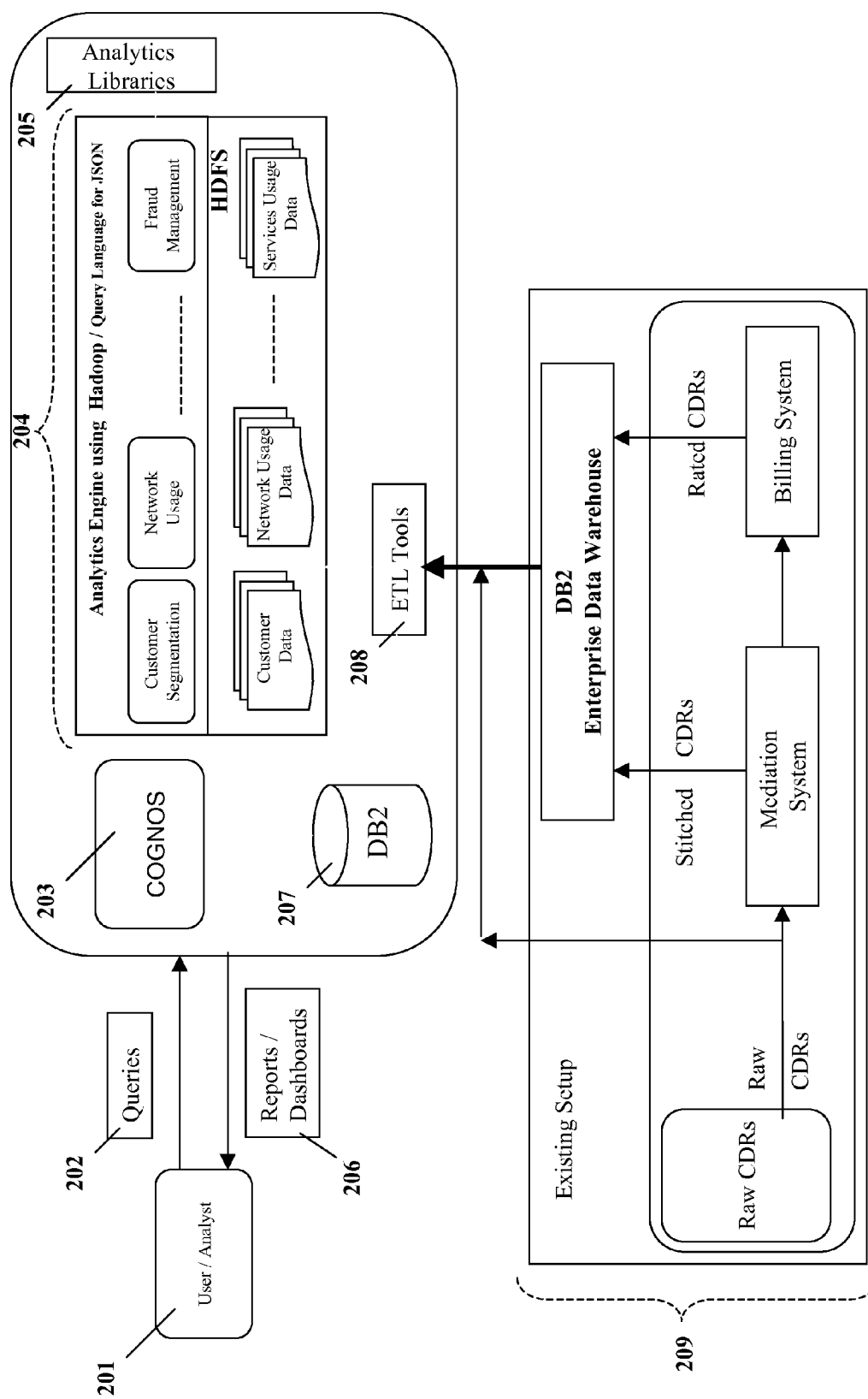
FIG. 2 illustrates an exemplary embodiment using a dashboard application and data warehouse database.

Referring now to FIG. 2, there is depicted a block diagram of an exemplary embodiment of an advanced analytics system 204. Queries 202 are run over IBM® COGNOS® 203 running over DB2® 207. Analytics are performed over Hadoop/query language for JSON of the advanced analytics system 204 from data obtained from DB2® data warehouse 209. Reports and/or dashboards 206 are returned for use by a system user 201. IBM® COGNOS® and IBM® DB2® are trademarks of International Business Machines Corporation in the United States, other countries, or both.

Figure 3:
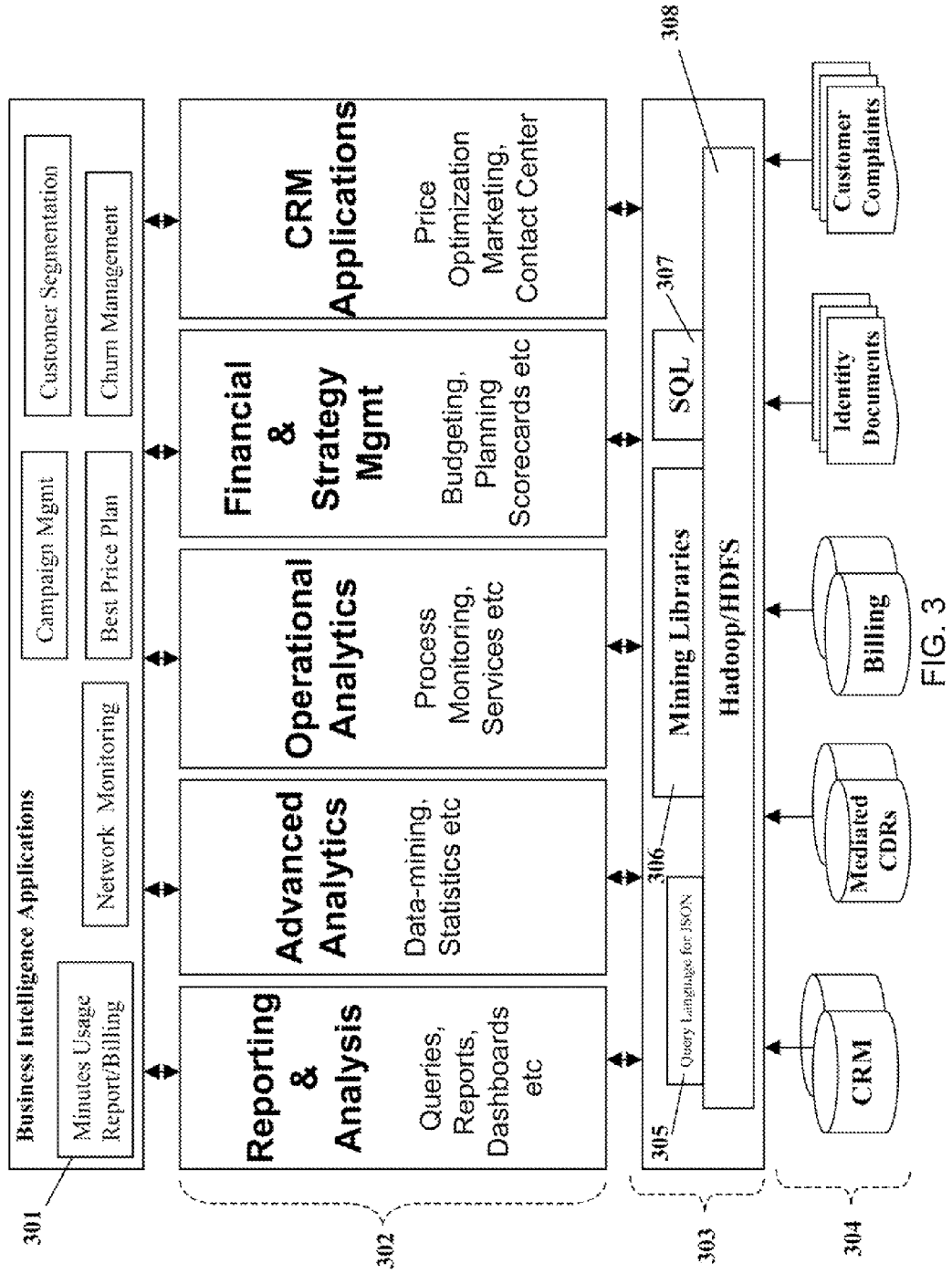
FIG. 3 illustrates business intelligence applications and related sub-components in operation with an exemplary embodiment.

FIG. 3 illustrates an embodiment of embodiments of the invention wherein a non-limiting set of tools and subcomponents 302 sit on top of the advanced analytics system 303 of embodiments of the invention. Business intelligence applications 301 use the subcomponents 302 to derive business intelligence solutions from information provided by the advanced analytics system 303 which integrates data from the system informational databases 304.

Figure 4:
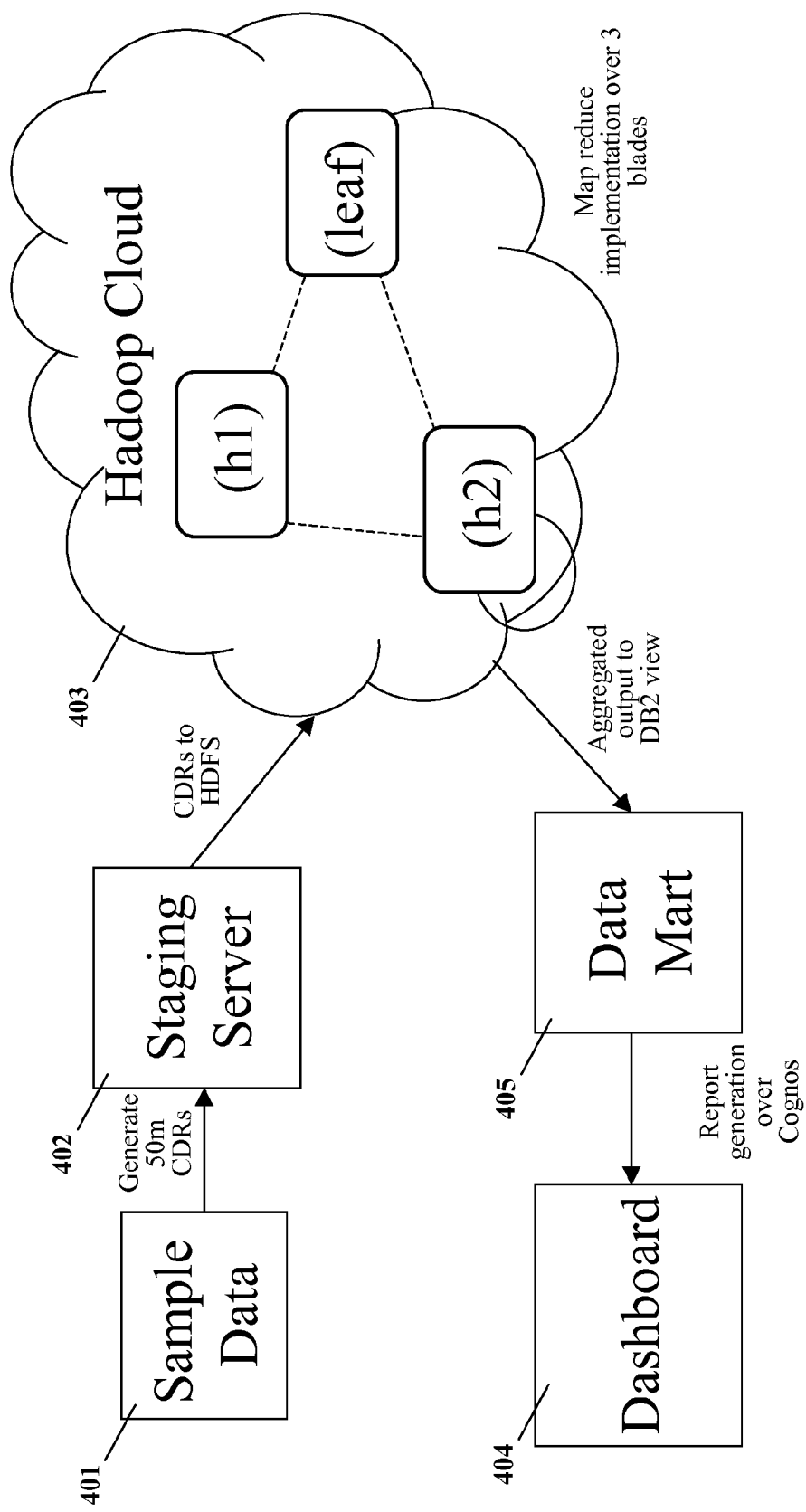
FIG. 4 illustrates an exemplary querying system according to an embodiment.

Referring now to FIG. 4, a particular case study involving an embodiment of the invention is depicted. In this configuration, sample data of 50 million CDRs 401 is created and stored on a staging server 402. This data is then transferred to a HDFS cloud 403 configuration of embodiments of the invention. Aggregated output data is then sent to a data mart 405 and ultimately to a COGNOS® dashboard 404 for viewing.

FIG. 5 is a table describing non-limiting examples of use cases for embodiments of the invention and identifies some attributes that may be required to obtain results. Such scenarios include account turnover analysis, fraud detection, and financial product or service innovation. Each scenario, as depicted in the table of FIG. 5, would likely require a minimum set of data, but could provide a user with important business intelligence or indicate a possible return on investment. FIG. 6 is a table describing certain lifecycle management scenarios, such as determining average account balance and the number of accounts with a particular outstanding balance. Determination of the use cases and scenarios outlined in tables of FIGS. 5 and 6 may be prohibitively inefficient and resource consuming under present massive data storage and access techniques. However, according to the advanced analytics described in embodiments of the invention, such queries are possible and efficient over massive amounts of data, at least up to and including the petabyte scale.

An experimental case study involving network usage modeling for a typical telcom is used as a non-limiting example. For purposes of experimentation and evaluation, the case study utilized, inter alia, MapReduce, Hadoop, the query language for JSON, and HIVE components, and was designed to reflect the reporting needs of relevant business analysts and the data requests they would be likely to issue over the data stored and/or the models (e.g., account details, length of time open, turnover likelihood, segmentation) determined from the data.

Hive (Hive-Hadoop wiki. http://wiki.apache.org/hadoop/Hive) is a data-warehousing tool developed at Facebook and is mainly used for log processing, searching text, and document indexing. Data is loaded into HDFS and Hadoop map-reduce jobs are used to process data. It has support for ad-hoc querying, schema, command line and JDBC interface. It uses database schema to convert SQL like queries into corresponding map-reduce jobs which are executed on the underlying Hadoop system.

A dashboard utilizing such data could enable a user, among other things, to quickly understand the traffic flowing through a network along various dimensions of interest. For example, network usage monitoring may be essential for planning aspects of a network expansion: (1) expansion (for example, adding a tower) targets capturing new users or reducing congestion, (2) business assessment of the need, impact and potential return on investment of expansion, and (3) an enterprise data warehouse based business intelligence system cannot provide the analytics efficiently and with needed latency.

The non-limiting case study was setup over a four node Hadoop cluster built using Blade Servers with two 3 Ghz Intel® Xeon® processors having 4 GB memory and 200 GB SATA drives. The machines run on RedHat® Linux® 5.2. The software stack comprised of Hadoop 0.18.3 with HDFS, the query language for JSON and Hive. The system also contains a staging server containing 50 million synthetic CDRs created from an initial masked set of 20000 CDRs. The dashboard itself was built using IBM® COGNOS® dashboards residing on another machine that also ran IBM® DB2®. The results from network monitoring queries were fed into DB2® from where the results were given to COGNOS® for dashboarding.

There are various studies to compare performance of different systems for data analytics. In one example, performance of Hadoop was compared with various distributed database systems such as a parallel SQL DBMS from a major relational vendor and Vertica system, which is a column oriented parallel database system. This example shows that Hadoop outperforms parallel databases in data loading but parallel databases outperform Hadoop for various analytical tasks. This example also demonstrates that when analytics involves aggregation, Hadoop performs better than the case when simple selection is involved. Through comparison of various technologies that exploit MapReduce with RDBMS, the present case study complements the example in the context of a real-world business setting.

FIG. 9 is a table showing three sample queries, one for each category: query Q1 is a simple selection query which is likely to output a large volume of call records, queries Q2 and Q3 are aggregation queries. Q2 has simple aggregation over call_duration, whereas Q3 has union of two sub-queries. The queries were used in the case study to compare performances of four structured data access mechanisms:

1. SQL query over RDBMS: A benchmark representing the existing data warehouse environment familiar to analysts. Test data was loaded on a IBM® DB2® v9running on Microsoft® Windows® Server 2003 with 4 GB RAM to get a benchmark value for performance. This implementation is not comparable to the shared-nothing distributed enterprise data warehouse implemented at the client data center.

2. MapReduce programs: MapReduce programs were written in Java 1.6 for computing the answers to the queries.

3. Hive: Hive provides SQL like interface for querying structured data. As such, tables were created in Hive to store the CDRs and queries were executed on this table 4. The query language for JSON: Data was converted into JSON format and written into HDFS. The query language for JSON queries corresponding to the queries given in FIG. 5 were run to get the desired output.

Figure 10:
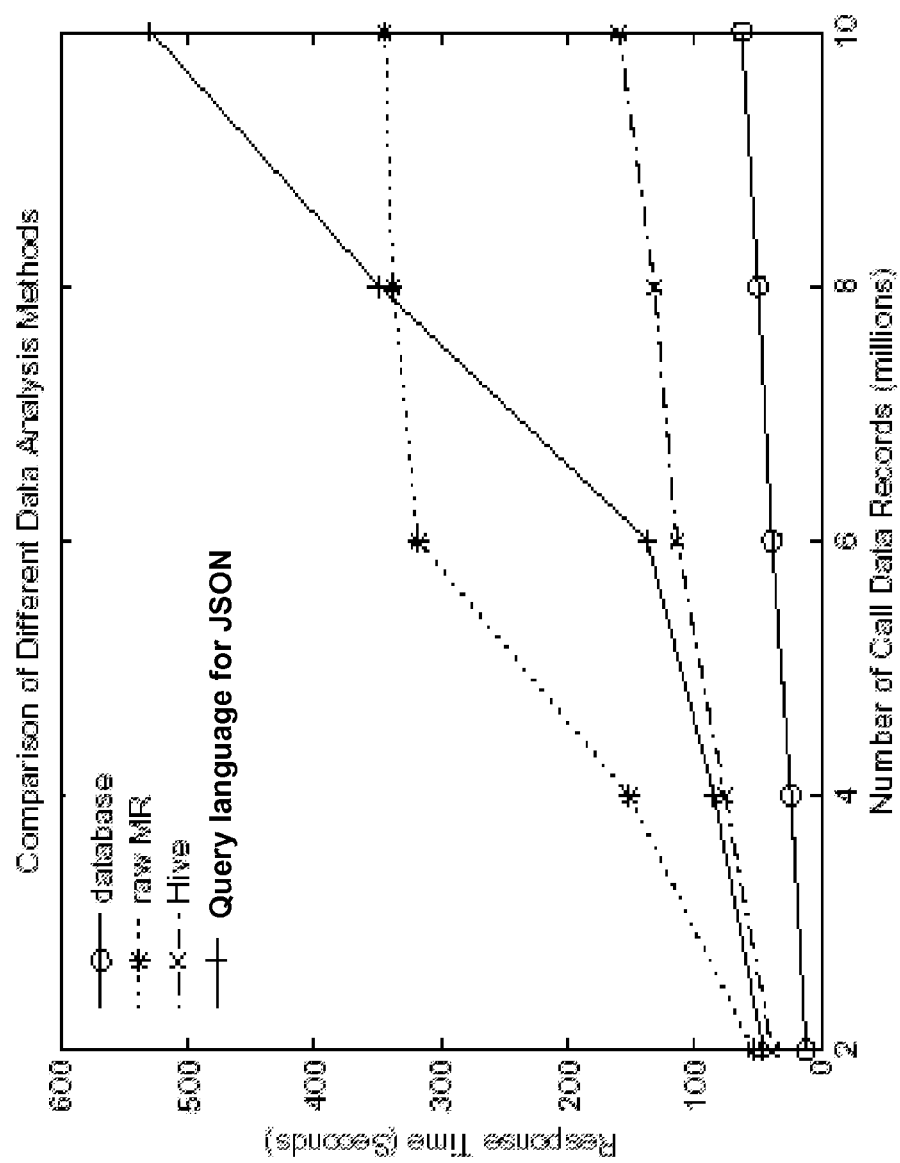
FIG. 10 graphically illustrates results of Q1.

FIG. 10 shows performance of various queries Q1 over four systems with varying number of CDRs from 2 million to 10 million. In this case, relational database works very well. This can be explained with the existence of corresponding indices on the database. Raw map-reduce along with the query language for JSON produced bad performance in this case, explained by the fact that Hadoop uses HDFS for exchanging information between different nodes. In the case of Q1, map output was large number of CDR records (e.g., 6 million out of 10 million) satisfying the select condition. As such, each map has to write large amount of data to the disk. FIG. 10 supports the conclusion that raw map reduce is not optimal when large amount of data is required as output. Hive performed better than MapReduce and the query language for JSON as the Hive does a better job of optimizing performance using suitable numbers of map and reduce jobs. For example, for MapReduce number of map and reduce jobs were 9 and 1 (default setting) whereas in Hive it was 35 and 0. Thus, to get better performance from any map-reduce setting, setting the optimal number of map and reduce jobs is important. Forcing the number of reducers to zero in map function leads to a drastic performance improvement. In addition, the query response time for 10 million CDRs reduces to 130 seconds when the number of reducers is zero, which is comparable to the Hive performance.

Figure 11:
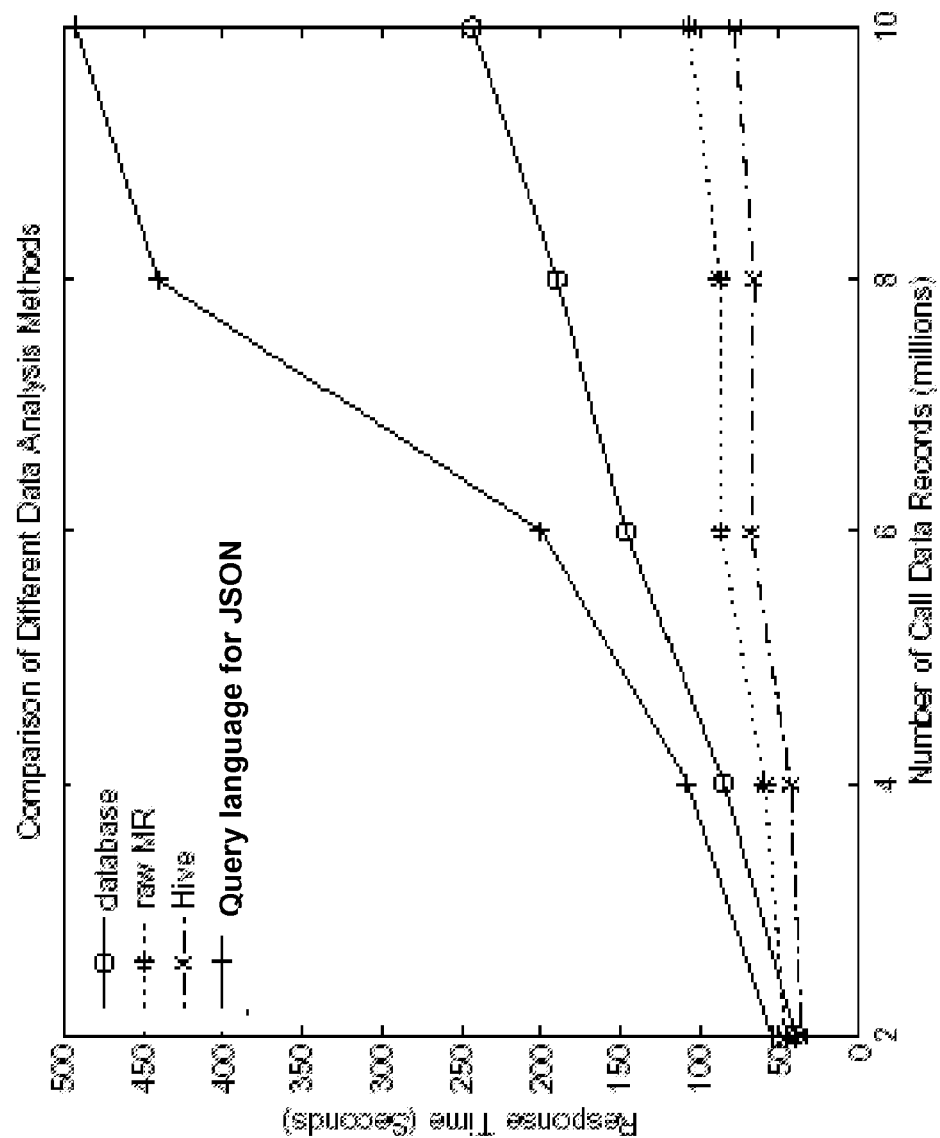
FIG. 11 graphically illustrates results of Q2.
Figure 12:
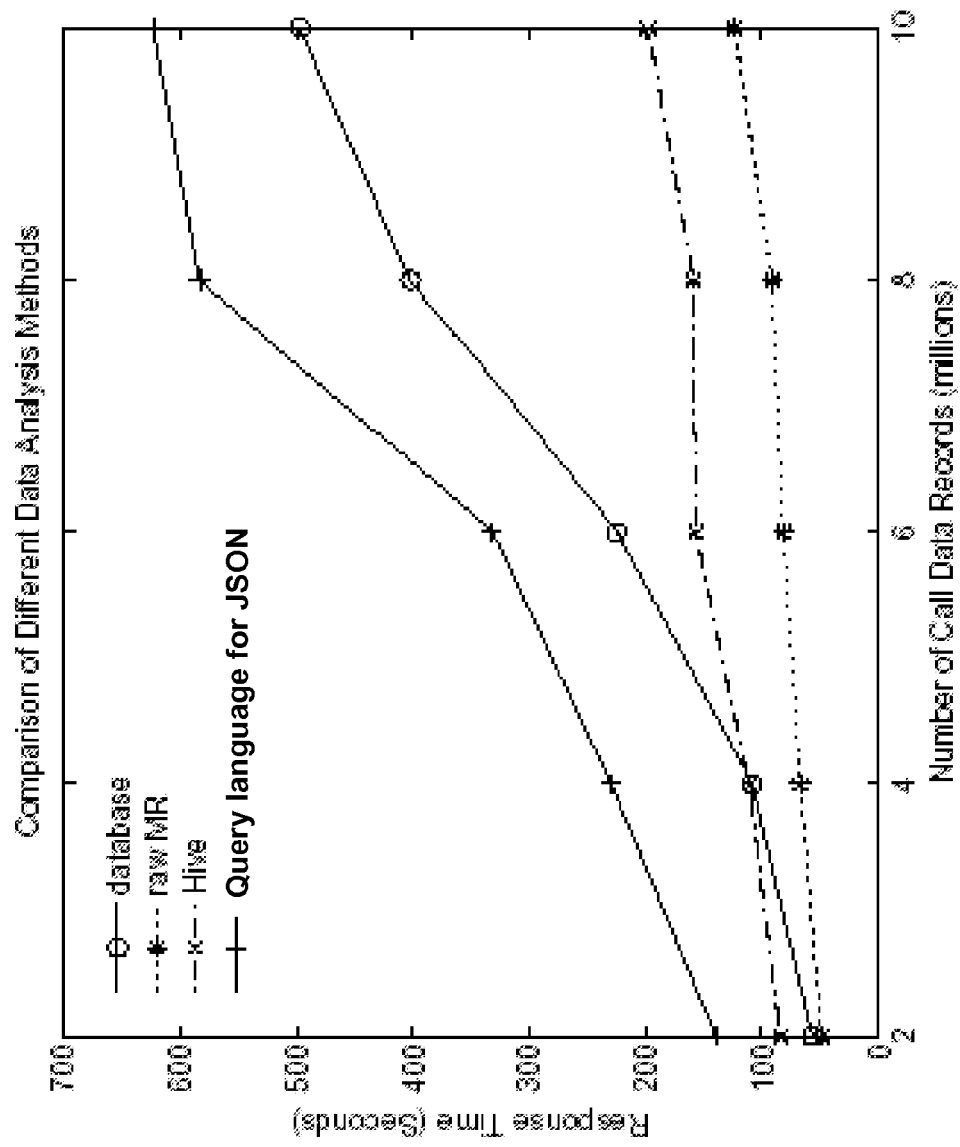
FIG. 12 graphically illustrates results of Q3.

FIG. 11 shows performance of Q2 for four alternative systems. In this case Hive and MapReduce systems perform better than SQL and the query language for JSON. FIG. 11 demonstrates that cases where aggregation is required over attributes which can be used for partitioning data (in this case caller_number), distributed processing helps in getting better performance. In this case Hive performs better than any other implementation FIG. 12 shows performance comparison for Q3. Performance results for Q3 are similar to that for Q2 except for a few differences: (1) SQL performs worse, and (2) MapReduce performs better than Hive. This query involves union of two sub-query results. For all three queries the query language for JSON performed the worst. This is due to the fact that the query language for JSON is designed to query semi-structured data in XML like format. In JSON, every object is written in attribute name: attribute value format leading to large increase in file size. The query language for JSON has to read those text formatted attributes to process any query. The presence of schema support and indexing will help the query language for JSON perform better on structured data.

The query language for JSON developer team has enhanced the query language for JSON with support for schema specification. Specifically, this will reflect in reduced parsing time as the compiler is now sure of the maximum size of each tuple that it will see in the input file. Initial evaluation reports suggest a 40% reduction in the conversion time from the input JSON to the intermediate representation that is used by the compiler.

In certain embodiments of the invention, the data of concern is structured data generated by the traffic generated over a network (for example, a telecommunications network) apart from data generated by transactions performed by or on behalf of customers. In addition, embodiments of the invention adapt existing data models or querying and data access methods to work with map-reduce.

A further case study, called MAST—Massive Analytics Solution for Telecommunication, stands as another non-limiting example of embodiments of the invention. MAST allows an exemplary and non-limiting telcom to move data into the Hadoop cluster for archival instead of to a tape system. In addition, users are able to seamlessly query the entire collection of data—that residing inside the warehouse and archived on Hadoop using a single interface, such as a COGNOS® dashboard. This requires replication of the telcom data model, better known as the Shared Information/Data Model (SID) on Hadoop as well as intelligently splitting the incoming query into two parts: one that would run on the warehouse and the other that runs on Hadoop. Apart from data retrieval support, the system also provides certain libraries that can, among other things, be invoked to view and build segmentation or loyalty models. Such models may be utilized to answer analytic queries that can also be fired by from the common interface.

FIG. 1, described above, also illustrates the proposed architecture of MAST and the flow of information through the system. In accordance with providing a non-disruptive enhancement of analytics capabilities, MAST is being built on top of the existing Enterprise Data Warehouse (EDW) implementation. The EDW gets inputs from both the Mediation System and the Billing System. Outputs generated by these systems are modified versions of the raw CDRs called mediated CDRs and rated CDRs respectively which will be archived on Hadoop and will be made queryable. In addition, certain embodiments of may provide an automatic query partition adaptor and techniques for improving the response times of various query answering tools over Hadoop.

Currently, there are various efforts to improve performance of the map-reduce framework for analyzing structured and/or semi-structured data. Embodiments of the invention leverage those efforts as part of the implementation. As a non-limiting example, Hive uses partitions to improve search performance. In that case, while inserting data (for example, using an HDFS file) a user specifies the value of the partition attribute to which the file belongs. If the search query is over the partition attribute, Hive selects files over which the query needs to be evaluated thus reducing the search space and improving query performance. However, if the search query is over some other attribute, partition can not be used. As such, building an index using partition improves performance of selection over other attributes. In addition, index can be a reverse index mapping attribute value to the filename of the corresponding partition. To process a selection query, the system can use index to first get a list of partition file names and then use map-reduce to perform actual selection.

Another non-limiting example improves performance using indexing by parsing the incoming data and arranging the data with index. In this example, data records containing a particular value of the indexing attribute can be stored along with the corresponding index itself. As such, processing a selection query involves using the index to get the in-place records. Thus, the modified data can be stored over HDFS to process the query using map-reduce. Such an index can easily be built using Apache Lucene.

It should be noted as well that aspects of the invention may be embodied as a system, method or apparatus. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of an apparatus embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A system comprising:
   one or more data parallel clusters of computing devices configured to communicate with one or more data sources, the one or more data parallel clusters of computing devices storing intermediate data derived from structured data of the one or more data sources, the intermediate data being offloaded from the one or more data sources; and
   a query processor which processes system queries on the intermediate data and the structured data of the one or more data sources, wherein the processing of the system queries is based on a reverse index mapping attribute value, and generates query results; and
   an adapter for converting high level language queries into low level language queries comprising map reduce queries, the map reduce queries being configured to query the intermediate data stored in the one or more data parallel clusters of computing devices;
   one or more common interfaces for sending the system queries to the query processor, and receiving the query results based on the steps of converting and processing;
   wherein the one or more data parallel clusters of computing devices further comprise data parallel and compute parallel clusters of computing devices;
   wherein the query processor receives the system queries comprising the high level language queries and sends the system queries in parallel to the one or more data sources and to the adapter for conversion to the low level language queries comprising the map reduce queries; and
   wherein the map reduce queries on the intermediate data are configured for faster querying with respect to the system queries on the structured data of the one or more data sources.

2. The system of claim 1, wherein the query processor receives the system queries comprising high level language queries from the one or more common interfaces and sends the system queries in parallel to the one or more data sources and to the adapter for conversion to cluster language queries, the cluster language queries being configured to query data stored in the one or more data parallel clusters of computing devices.

3. The system of claim 1, further comprising:
   one or more business intelligence applications;
   wherein the system queries are configured to conduct advanced analytics;
   wherein the query results are communicated to either the one or more business intelligence applications or to one or more data applications, the business intelligence applications configured to communicate with the data applications.

4. The system of claim 1, wherein the one or more data parallel clusters of computing devices is implemented utilizing map reduce.

5. The system of claim 1, wherein the one or more data sources is a data warehouse.

6. The system of claim 1, wherein the one or more common interfaces is a dashboard application.

7. A method comprising:
   configuring one or more data parallel clusters of computing devices to communicate with one or more data sources;
   storing intermediate data in the one or more data parallel clusters of computing devices derived from structured data of the one or more data sources, the intermediate data being offloaded from the one or more data sources; and
   utilizing a query processor to process system queries on the intermediate data and the structured data of the one or more data sources, and generate query results, wherein the processing of the system queries is based on a reverse index mapping attribute value;
   utilizing an adapter for converting high level language queries into low level language queries comprising map reduce queries the map reduce queries being configured to query the intermediate data stored in the one or more data parallel clusters of computing devices;
   one or more common interfaces for sending the system queries to the query processor, and receiving the query results based on the steps of converting and the processing;
   wherein the one or more data parallel clusters of computing devices further comprise data parallel and compute parallel clusters of computing devices;
   receiving the system queries comprising the high level language queries at the query processor, wherein the query processor sends the system queries in parallel to the one or more data sources and to the adapter for conversion to the low level language queries comprising the map reduce queries; and
   wherein the system map reduce language queries on the intermediate data are configured for faster querying with respect to the system queries on the structured data of the one or more data sources.

8. The method of claim 7, said receiving comprises receiving the system queries comprising high level language queries at the query processor from the one or more common interfaces, wherein the query processor sends the system queries in parallel to the one or more data sources for processing and to the adapter for conversion to cluster language queries, the cluster language queries being configured to query data stored in the one or more data parallel and compute parallel clusters of computing devices.

9. The method of claim 1, further comprising:
   configuring system queries to conduct advanced analytics;

communicating the query results either to one or more business intelligence applications or to one or more data applications, wherein the business intelligence applications are configured to communicate with the data applications.

10. The method of claim 7, further comprising implementing the one or more data parallel clusters of computing devices utilizing map reduce.

11. The method of claim 7, wherein the one or more data sources is a data warehouse.

12. The method of claim 7, wherein the one or more common interfaces is a dashboard application.

13. A computer program product comprising:
a computer readable storage medium having computer readable program code embodied therewith, the computer readable program code comprising:
computer readable program code configured to operatively connect one or more data parallel clusters of computing devices in communication with one or more data sources;
computer readable program code configured to store intermediate data in the clusters derived from structured data of the one or more data sources, the intermediate data being offloaded from the one or more data sources; and
computer readable program code configured to utilize a query processor to process system queries on the intermediate data and the structured data of the one or more data sources, wherein the processing of the system queries is based on a reverse index mapping attribute value, and generate query results;
computer readable program code configured to utilize an adapter for converting high level language queries into low level language queries comprising map reduce queries, the map reduce being configured to query the intermediate data stored in the one or more data parallel clusters of computing devices;
one or more common interfaces for sending the system queries to the query processor, and receiving the query results based on the steps of converting and processing;
wherein the one or more data parallel clusters of computing devices further comprise data parallel and compute parallel clusters of computing devices;
computer readable program code configured to receive the system queries comprising the high level language queries at the query processor, wherein the query processor sends the system queries in parallel to the one or more data sources and to the adapter for conversion to the low level language queries comprising the map reduce queries; and
wherein the system map reduce language queries on the intermediate data are configured for faster querying with respect to the system queries on the structured data of the one or more data sources.

14. An apparatus comprising:
one or more processors; and
a computer readable storage medium having computer readable program code embodied therewith and executable by the one or more processors, the computer readable program code comprising:
computer readable program code configured to receive a high level query;
computer readable program code configured to store intermediate data in clusters derived from structured data of one or more data sources, the intermediate data being offloaded from the one or more data sources; and
computer readable program code configured to utilize a query processor to process system queries on the intermediate data and the structured data of the one or more data sources, wherein the processing of the system queries is based on a reverse index mapping attribute value, and generate query results;
computer readable program code configured to utilize an adapter for converting the high level language queries into low level language queries comprising map reduce queries, the map reduce queries being configured to query the intermediate data stored in one or more clusters of computing devices;
one or more common interfaces for sending the system queries to the query processor and receiving the query results based on the step of converting and processing;
wherein the one or more data parallel clusters of computing devices further comprise data parallel and compute parallel clusters of computing devices;
computer readable program code configured to receive the system queries comprising the high level queries at the query processor, wherein the query processor sends the system queries in parallel to the one or more data sources and to the adapter for conversion to the to the low level language queries comprising the map reduce queries; and
wherein the system map reduce queries on the intermediate data is configured for faster querying with respect to the system queries on the structured data of the one or more data sources.

* * * * *